Mar. 13, 1923. Re. 15,560
E. R. CASE
ELECTRIC DEVICE FOR TREATING AIR
Original Filed Mar. 22, 1920
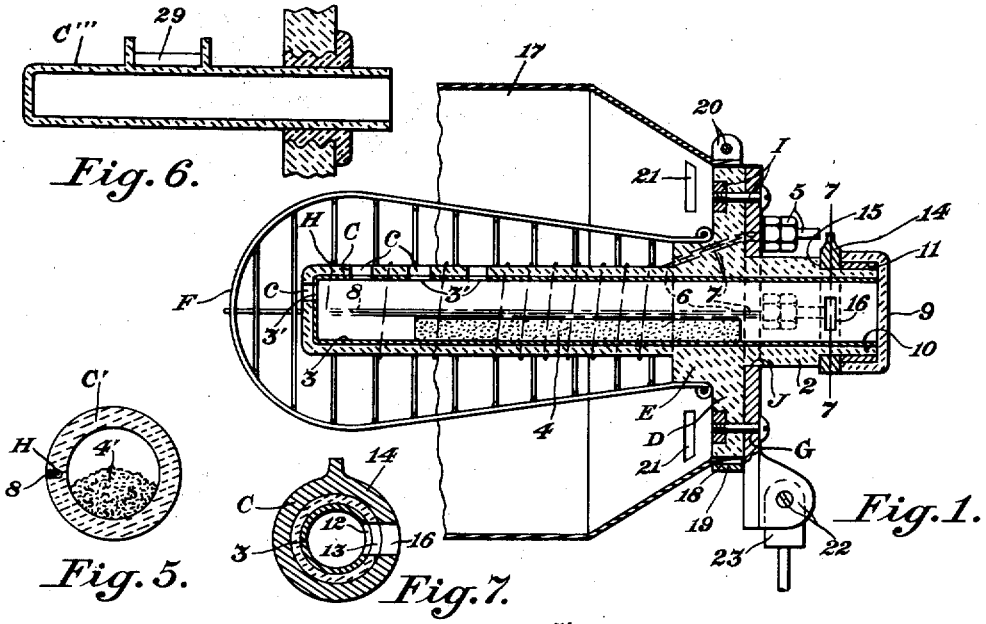
Fig. 6.
Fig. 1.
Fig. 5.
Fig. 7.
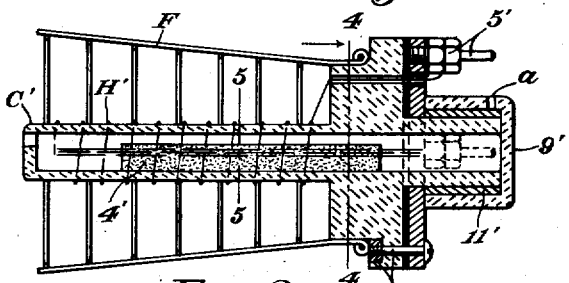
Fig. 2.
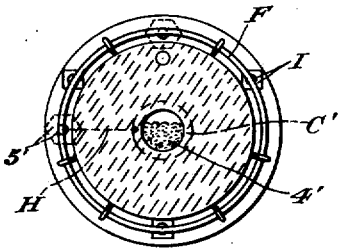
Fig. 4.
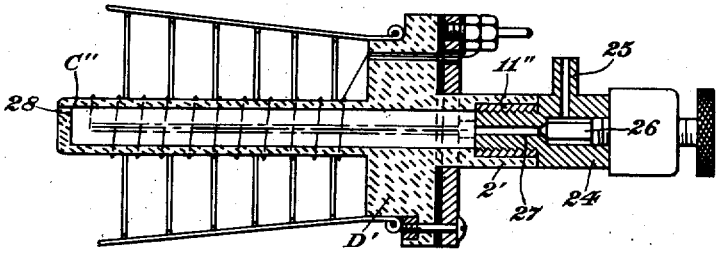
Fig. 3.
E. R. Case
INVENTOR.

Reissued Mar. 13, 1923. Re. 15,560

UNITED STATES PATENT OFFICE.

EGERTON RYERSON CASE, OF TORONTO, ONTARIO, CANADA.

ELECTRIC DEVICE FOR TREATING AIR.

Original No. 1,378,095, dated May 17, 1921, Serial No. 367,906, filed March 22, 1920. Application for reissue filed September 2, 1921. Serial No. 498,149.

*To all whom it may concern:*

Be it known that I, EGERTON RYERSON CASE, a subject of the King of Great Britain, of the city of Toronto, county of York, Province of Ontario, Canada, have invented a certain new and useful Electric Device for Treating Air, of which the following is a specification.

My invention relates to an electric device for treating air, and the principal object of the invention is to treat those suffering from whooping cough or bronchitis, or other bronchial affections, as well as those suffering from throat and lung affections that can be treated in this manner; and in the following specification several apparatus within my invention will be hereinafter particularly described as examplary means whereby the object thereof may be carried out, and what I claim as new will be set forth in the claims forming part of this specification.

Figures 1, 2 and 3 are vertical central longitudinal sections through apparatus within my invention showing different embodiments thereof adapted for distributing a liquid and a non-liquid treating agent. Figs. 4 and 5 are vertical cross sections on the lines 4—4, and 5—5, respectively, Fig. 2. Fig. 6 is a vertical central longitudinal section through a modified form of holder for a treating agent, and Fig. 7 is a vertical section on the line 7—7, Fig. 1.

The particular form of treating-agent holding-means and the constructions and designs whereby suitable electric connections are had, and the particular construction illustrated for controlling or containing the supply of the treating agent, are not essential to the invention.

Since the quantity of treating agent designed to be held by my device at any one time is relatively quite small, and is preferably located in intimate proximity to the source of heat, it naturally follows that very little time elapses before the treating agent is transformed into the desired state.

The treating agent holding- or containing-means, which also performs the function of a base or support for the resistor in the examplary disclosures made, may be of metal or of any suitable material well-known in the electrical art, such as porcelain, or fused silica.

C is the base or member supporting the resistor H.

Preferably integrally formed with said base or member C is a flange D provided with a breast E projecting beyond one side thereof to form an annular flange so as to support any suitable screen or guard F, which surrounds the base or member C supporting the resistor. G is a plate faced up against the outer face of the flange D and suitably secured thereto by any suitable fastening means such as nuts and bolts commonly designated I. The plate G is provided with an opening J therethrough, and projecting through said opening J is a tubular member 2 preferably integrally carried by the flange D. 3 is a metal tubular lining for the base or member C, and the tubular member 2, and is designed to contain a non-liquid treating-agent 4. Binding posts and nuts, commonly designated 5 may be carried by the plate G to which the ends 6 of the resistor H are connected. The ends 6 pass through suitable holes 7 shown by dotted lines in Fig. 1 formed in the breast E and flange D, and also in the plate G. A certain section of the resistor H is embedded in the longitudinal groove 8 formed in one side of the base or member, and the said groove is afterward closed by any suitable material well-known in the art.

Any means may be employed to introduce the non-liquid treating agent into the metal tubular lining 3. A convenient means for this purpose is as follows: 9 is a cap, which is designed to fit over the flange 10 formed in the outer end of the tubular member 2, and to provide for ease of placing and removal of said cap, a suitable lining 11 is interposed between said cap and said flange 10.

The said cap closes the open end of the said base or member C as well as the tubular lining 3.

The base or member C, and the tubular lining 3 are provided respectively with apertures or holes $c$ and 3′ through which escapes the treating agent.

If it is desirous of passing air into the tubular lining 3, this may be done in various ways. For example, ports 12 and 13 may be formed in the lining 3 and base or member C respectively near their intake ends. 14 is a valve or damper mounted to be moved on the flange 10 and between the annular shoulder 15 and the lining 11. This damper is provided with a port 16, which when alined with the ports 12 and 13 permits the passage of air into and through the tubular lining 3.

If desired, the form of device illustrated in Fig. 1 may be provided with any suitable housing 17 suitably carried by the flange D in any manner well-known in the art. For example the housing 17 may be provided with a flange 18 to fit around the flange D, and the flange 18 may be clamped in place by a split ring 19 having fastening means in the form of ears and a coupling pin commonly designated 20. Formed in the said housing, if desired, are a plurality of apertures or openings 21 so as to permit currents of air to pass therethrough when the device is in a horizontal or uninverted vertical position. Since the temperature will be higher on the inner side of the housing than on the outer side, it follows that currents of air will flow through the apertures or openings 21 into and out of said housing.

If desired, any suitable pivoting means commonly designated 22, and preferably carried by the plate G may be used to pivot the form of device illustrated in Fig. 1 to a suitable stand or support 23.

The metal lining 3 may be readily removed from the base or member C for cleaning purposes.

In Fig. 2, I show substantially the same form of device as is illustrated in Fig. 1, except that the base or member C′ does not possess a tubular lining. The resistor H′ is coupled to any suitable binding posts 5′ and is otherwise suitably associated with said base or member C′. The control of air into and through the base or member C′ is controlled by forming a port *a* in the cap 9′, the port being normally closed by the lining 11′. By loosening the cap 9′, the port *a* may be fully opened to allow passage of air into and through the base or member C′. 4′ is the treating agent mounted within the base or member C′, and this can be replenished by removing the cap 9′ as will be understood.

In Figs. 2 and 3, I show that my device may be employed without the use of the housing 17.

The base or member C″ preferably integrally forms part of the flange D′, though not essentially, and the resistor is carried by the said parts, and suitable electrical connections are had in any suitable manner, as will be understood. Preferably integrally formed with the flange D′ is a tubular member 2′ which communicates with the interior of the base or member C″. 11″ is a metal lining suitably secured within the tubular member 2′ and coupled thereto is the valve casing 24. This valve casing is provided with an inlet 25 whereby fluid is conducted by any suitable means (not shown) from a suitable source of supply (not shown). The valve 26, of a well-known form, controls the supply of fluid through the duct 27 into the base or member C″.

The fluid transformed by the heat escapes from the base or member C″ by the aperture or opening 28 preferably located in the position shown in Fig. 3, so that the base or member C″ may contain quite a supply of fluid in the initial stage without the loss of the fluid through the said aperture or opening 28. So soon as the various parts described become fully heated, the fluid escaping from the valve casing 24 will begin to be vaporized.

In the form of base or holder C‴ illustrated in Fig. 6, an open trough 29 is provided to receive the treating agent. This form of base or member shows clearly that it is not absolutely necessary to pass the treating agent through the base or member of the device.

While I have described what I consider to be the best embodiments of my invention, I desire it to be understood that the principle may be embodied in many different forms, and I desire not to be limited beyond the requirements of the terms of my claims and the prior art.

Functionally considered the base or member C, and its equivalent, is a vaporizing device which will very quickly vaporize the liquid treating agent brought into contact therewith, or fed therethrough.

What I claim is:

1. A device of the class described and for the purpose set forth including means for directly carrying a liquid or non-liquid treating agent for air at large, which is transformed therein; a removable lining for said treating agent carrying means, and means whereby said means is electrically heated.

2. A device of the class described and for the purpose set forth including a member designed to directly contain a liquid or non-liquid treating agent for air which is transformed therein, and apertured beyond its receiving end to permit the treating agent to escape therefrom, a removable lining for said treating agent carrying means and means whereby the same is electrically heated.

3. A device of the class described and for the purpose set forth, including a portable member provided with a receiving end, and a discharge aperture located in spaced relation to said receiving end, and adapted to directly carry a liquid or non-liquid treating-agent for air at large; a removable lining for said member, means whereby the same is electrically heated, and manually operated closure means for the receiving end of said member.

4. A device of the class described and for the purpose set forth, including a chambered member for a treating-agent, having an intake-opening and a discharge aperture spaced apart from said intake-opening; a removable lining for said member, means whereby said chambered member is electrically heated, and closure means for the intake end of said member.

5. A device of the class described, and for the purpose set forth, comprising a source of electrical heat, means heated by said source of heat, and provided with an inlet, and a discharge aperture located in spaced relation to said inlet, and adapted to transform a liquid or non-liquid treating agent into a suitable state for dispersal in the air at large through said discharge aperture and a removable apertured lining for said means.

6. A device of the class described and for the purpose set forth including a member designed to directly contain a liquid or non-liquid treating agent for air which is transformed therein, and apertured to permit the transformed treating agent to escape therefrom, and to allow a current of air to pass therethrough, and means whereby the same is electrically heated.

7. A device of the class described and for the purpose set forth, including a member designed to directly contain a treating agent for air which is transformed therein, and apertured to permit the transformed treating agent to escape therefrom, and to allow a current of air to pass therethrough; closure means for the receiving end of said member, and means whereby said member is electrically heated.

8. A device of the class described and for the purpose set forth including a member designed to directly contain a treating agent for air, and apertured to permit the transformed treating agent to escape therefrom, and to allow a current of air to pass therethrough, a removable apertured lining for said member, and means whereby the same is electrically heated.

9. A device of the class described and for the purpose set forth including an apertured member designed to contain a treating agent for air with which is associated a bore-provided flange which supports a tubular member, which communicates with said first-mentioned member; means whereby said first-mentioned member is electrically heated, and means to control the supply of treating agent to said first-mentioned member, and designed to be carried by said tubular member.

10. A device of the class described and for the purpose set forth including an apertured member designed to contain a treating agent for air with which is associated a bore-provided flange which supports a tubular member, which communicates with said first-mentioned member; means whereby said first-mentioned member is electrically heated; means to control the supply of treating agent to said first-mentioned member, and designed to be carried by said tubular member, and an apertured reflector supported by said flange.

11. A device of the class described and for the purpose set forth including an apertured member designed to contain a treating agent for air, with which is associated a bore-provided flange which supports a tubular member, which communicates with said first-mentioned member; an apertured tubular lining located within said apertured member and passing through said flange and said tubular member, and provided at its intake end with a port which is alined with a port formed in said apertured member; means whereby said apertured member is electrically heated; a valve controlling the passage of air through said ports into said lining, and a cap closing the intake end of said tubular member.

12. As a new article of manufacture, an apertured member made of suitable material that can be heated by electric current, and adapted to directly contain a liquid or non-liquid treating agent for air which is transformed therein; and provided with a port to allow air to pass thereinto.

13. A device of the class described including electric means to produce heat, a housing adapted to permit a natural current of air to pass thereinto and therethrough, and means to supply a treating agent transformed by said heat to said current of air passing through said housing.

14. A device of the class described and for the purpose set forth including chambered means for directly carrying a liquid or non-liquid treating agent, and adapted to perform the function of a support; a heating element carried thereby to transform the treating agent therein, and a supporting member separably associated with said carrying means and adapted to permit of electrical connections being made therethrough.

15. An apparatus of the class described comprising chambered means adapted to directly carry a treating agent which is transformed therein; a resistor associated therewith to heat the same; a supporting member adapted to removably support said means, and means to permit of the direct feeding of the liquid or non-liquid treating agent to said treating agent carrying means.

16. A device of the class described and for the purpose set forth comprising a chambered member for directly carrying a liquid or non-liquid treating agent; means whereby said member is electrically heated to transform the treating agent therein, and an independently removable member adapted to house said other member and to receive the transformed treating agent, and apertured to permit the transformed treating agent to freely pass therefrom.

17. A device of the class described and for the purpose set forth comprising a chambered member for directly carrying a liquid or non-liquid treating agent; means whereby said member is electrically heated to transform the treating agent therein; an independently removable member adapted to house said other member and to receive the transformed treating agent, and apertured to permit the transformed treating agent to pass therefrom, and means to permit of a liquid or non-liquid treating agent to be fed to said first-mentioned member.

18. A device of the class described and for the purpose set forth comprising a chambered member for directly carrying a liquid or non-liquid treating agent; means whereby said member is electrically heated to transform the treating agent therein; an apertured member surrounding said chambered member, and an independently removable member adapted to house said members and to receive the transformed treating agent, and apertured to permit the transformed treating agent to freely pass therefrom.

19. A device for treating air comprising an apertured housing; a chambered member within said housing for directly carrying a liquid or non-liquid treating agent to be transformed therein, the transformed treating agent passing directly into said housing and out of the same, and electrical means associated with said chambered member to heat the contents thereof.

20. A device for treating air comprising an apertured housing; a chambered member within said housing for directly carrying a liquid or non-liquid treating agent to be transformed therein; the transformed treating agent passing directly into said housing and out of the same; electrical means associated with said chambered member to heat the contents thereof, and means to permit the feeding of a treating agent through said housing to said chambered member.

21. A device for treating air comprising an open port-provided housing; a chambered member within said housing for directly carrying a liquid or non-liquid treating agent to be transformed therein; the transformed treating agent passing directly into said housing and out of the same, and electrical means associated with said chambered member to heat the contents thereof.

22. An apparatus for treating air embracing means adapted to be electrically heated to change the state of treating agent brought into contact therewith; treating-agent carrying-means arranged in co-operative relationship to said electrically heated means, and means arranged in co-operative relationship to said electrically heated means and said treating-agent carrying-means to permit a natural draft to act as a vehicle for the transformed treating agent.

23. A device of the class described and for the purpose set forth comprising means designed to contain a liquid or non-liquid treating agent for air, which is transformed solely by the action of heat, and apertured to allow a natural current of air to pass thereinto to act as a vehicle to carry the transformed treating agent thereout of, and electric means to produce the temperature desired.

EGERTON RYERSON CASE.